United States Patent Office 3,714,127
Patented Jan. 30, 1973

3,714,127
URETHANE ADHESIVE HAVING IMPROVED SAG RESISTANCE
Hubert J. Fabris, Akron, Edwin M. Maxey, Kent, and Heinz Uelzmann, Cuyahoga Falls, Ohio (all c/o The General Tire & Rubber Company, P.O. Box 951, Akron, Ohio 44309)
No Drawing. Filed Dec. 13, 1971, Ser. No. 207,655
Int. Cl. C08g 22/00
U.S. Cl. 260—77.5 AM                         4 Claims

ABSTRACT OF THE DISCLOSURE

The addition of small amounts of di- and multi-primary amines to a two-component polyurethane-based adhesive increases the viscosity of the adhesive mixture immediately after blending of the adhesive components such that run-off or dripping of the adhesive from inclined or overhead surfaces is substantially eliminated.

BACKGROUND OF THE INVENTION

Urethane-based adhesives are well-known and widely used to adhere plastic adherends together. The choice of urethane adhesives over other adhesives is based in part upon their outstanding characteristics with respect to bond strength, chemical inertness, tensile strength and handling characteristics.

Generally speaking, conventional polyurethane-based adhesives are highly viscous two component systems wherein the two components contain all of the necessary ingredients to promote and accomplish full curing to a highly tenacious material. The two components are mixed together immediately prior to application to the surfaces to be bonded and cure quickly without application of heat or other energy.

One of the components of these polyurethane-based adhesives is an isocyanate-terminated prepolymer compound. Such a compound is normally prepared by reacting a polyisocyanate with a polyhydroxy compound or other compound containing labile hydrogen atoms that will give a positive Zerewitinoff test. The isocyanate group reacts with the labile hydrogen atom to form a urethane group. A molar excess of the isocyanate is added so that the resulting compound contains free isocyanate groups.

The other component is a cross-linking mixture comprising an admixture of a polyhydroxy compound free of isocyanate groups and selected urethane catalysts. When the two components are admixed, for example, in a high shear mixing head and then applied to a surface, the reactive hydrogen of the diamine reacts with the free isocyanate groups and chain extends and crosslinks the isocyanate-terminated prepolymer through catalytic action of the urethane catalyst to form a rigid, extremely tough cured adhesive.

These components can optionally contain other materials. For instance, the cross-linking mixture can contain polyhydroxy compounds to provide more bulk and to reduce blending and admixing disparities. Other optional ingredients which can be added to either component include thickeners, stabilizers, fire retardants, metal particles, fibers and the like.

Application of polyurethane-based adhesive to either metal or plastic surfaces generally involves cleaning the surfaces with or without the application of primers, drying the surfaces, applying the adhesives as a coating of finite thickness to the surfaces and then contacting the surfaces and clamping them together for a period sufficient to allow the adhesive to react and cure.

These conventional polyurethane-based adhesives suffer a serious disadvantage in that although highly viscous they tend to sag and run off or drip down inclined and overhead surfaces prior to solidification through curing. This "run-off" tends to form holes or bare spots on the surfaces to be bonded and impairs the ultimate bond strength of the joint. Although initial adhesive viscosity can be raised by the addition of thickeners such as fillers, powders and the like, such thickeners cause problems in obtaining complete admixing or blending of the ingredients in the high shear mixing head prior to applying the adhesive to the surfaces. An alternate practice is to increase the amount of urethane catalysts in the cross-linking mixture to promote quicker curing of the adhesive. However, increased catalyst levels seriously reduce the pot life or handling time of the adhesive composition.

Therefore, the primary object of this invention is to provide an improved polyurethane-based adhesive having significantly better curing characteristics and improved run-off or sag resistance than those of the prior art. Another object is to provide a process for upgrading conventional polyurethane-based adhesives to permit their application to inclined and overhead surfaces. A further object is to provide a process of improving a polyurethane-based adhesive system for use in joining plastic adherends together or plastic adherends to metal adherends that is easy to practice, that produces usable results and that is amenable to automatic and semi-automatic process control.

These and other objects of the invention which are apparent from the following description and claims are satisfied by this invention.

SUMMARY OF THE INVENTION

In polyurethane-based adhesives comprising an intimate blend of a polyisocyanate-terminated prepolymer, a polyhydroxy compound free of isocyanate groups and a urethane catalyst, this invention comprises the improvement comprising combining with tthe uncured adhesive from about 4 to 30, preferably about 5 to 15, equivalent percent based upon the free isocyanate content of the isocyanate-terminated prepolymer of a di- or multi-primary amine having the structure $R(NH_2)_n(OH)_m$ wherein R is an aliphatic essentially hydrocarbon group of no more than about 8 carbon atoms and having a valence of $m+n$, $n$ ranges in value from 2 to 4 and $m$ ranges in value from 0 to 3. This can also be expressed as the addition of an amount of the primary amine equivalent to about 0.04 to 0.30, preferably about 0.05 to 0.15, primary amine group per free isocyanate group in the polyisocyanate-terminated prepolymers. Amounts of said primary amines in excess of 30 equivalent percent as defined tend to decrease the handling time of the adhesive mixture to a degree which makes processing extremely difficult.

DESCRIPTION OF THE PREFERRED EMBODIMENT

This invention applies to polyurethane-based adhesives of a wide variety of compositions. The description herein will be restricted for clarity and conciseness to a two component conventional polyurethane-based adhesive system, but it should be noted that the invention is not so limited and can be applied to a wide variety of adhesives.

The first component of polyurethane-based adhesives comprises an isocyanate-terminated compound generally referred to in the art as a "prepolymer." It is prepared by reacting an organic polyhydroxy compound with a polyisocyanate under conditions wherein the number of isocyanate groups supplied in the polyisocyanate exceeds the number of labile hydrogen atoms in the polyhydroxy compound so that the resulting composition is free of labile hydrogen atoms and has in their stead a substantial number of free isocyanate groups for later reaction, preferably at least one free isocyanate group in the prepolymer per hydroxyl group in the polyhydroxyl compound. Polyhydroxy compounds usable herein can be either polyether polyols or polyester polyols having molecular weights from about 500 to 5000.

A wide range of polyether polyols can be used in making these adhesives such as diols, triols, tetrols and the like. Polyether diols are generally made by reacting an alkylene oxide such as propylene oxide with a strong base such as potassium hydroxide. Polyethers having a highly branched chain network are also usable. Such highly branched chain polyethers are readily prepared from alkylene oxides and initiators having a functionality greater than 2. The higher functional initiators that are useful with the alkylene oxides described above include polyols, polyamines and amino alcohols having a total of three or more reactive hydrogen atoms on hydroxyl and primary or secondary amino groups.

Suitable polyols include triols, such as glycerol, trimethylolpropane, butanetriols, hexanetriols, trimethylolphenol, tri(hydroxyphenyl)propane, novolaks, trialkanolamines; various tetrols, such as erythritol and pentaerythritol; pentols; hexols, such as dipentaerythritol and sorbitol, as well as alkyl glucosides, carbohydrates, polyhydroxy fatty acid esters such as castor oil, and polyoxy alkylated derivatives or polyfunctional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, for example, ethanolamine, diethanolamine, triethanolamine, isopropanolamine, diisopropanolamine, triisopropanolamine, 2-(2-amino-ethylamino)ethanol, 2-amino - 2(hydroxymethyl) - 1,3 - propanediol, diethylenetriamine, triethylenetetramine, urea and urea-formaldehyde polymers as well as various aryl polyamines such as 4,4',4''-methylidynetrianiline.

The amount of highly functional initiator normally employed with the linear-type polyethers described above is in the range of from 0.5 to 6.0 percent by weight of said initiator based on the weight of polyether. Generally, the polyethers suitable for employment can be conveniently characterized as normally liquid (although meltable solid polyethers are not excluded), pourable polyethers having viscosities in the range of from 50 centipoises to about 500,000 centipoises at room temperature (i.e., 25° C.) and preferably having molecular weight in the range of from 500 to 5000.

Polyester polyols are formed from the condensation of one or more polyhydric alcohols with one or more polycarboxylic acids. Examples of suitable polyhydric alcohols include the following: glycerol; pentaerythritol; trimethylolpropane; 1,4,6-octanetriol; butanediol; pentanediol; hexanediol; dodecanediol; octanediol; chloropentanediol; glycerol monoallyl ether; glycerol monoethyl ether; diethylene glycol; 2-ethylhexane-diol-1,4; cyclohexanediol-1,4; 1,2,6-hexanetriol; 1,3,5-hexanetriol; 1,3-bis-(2-hydroxyethoxy)propane and the like. Examples of polycarboxylic acids include the following: phthalic acid; isophthalic acid; terephthalic acid; terachlorophthalic aicd; maleic acid; dodecylmaleic acid; octadecenylmaleic acid; fumaric acid; aconitic acid; itaconic acid; trimellitic acid; tricarballyic acid; 3,3'-thiodpropionic acid; succinic acid; adipic acid; 1,4-cyclohexadiene-1,2-dicarboxylic acid; 3-methyl-3,5-cyclohexadiene-1,2-dicarboxylic acid and the corresponding acid anhydrides, acid chlorides and acid esters suchc as phthalic anhydride, phthaloyl chloride and the dimethyl ester of phthalic acid. Preferred polycarboxylic acids are the aliphatic and cycloaliphatic dicarboxylic acids containing no more than fourteen carbon atoms and the aromatic dicarboxylic acids containing no more than fourteen atoms.

A wide variety of polyisocyanate compounds can be used in the prepolymer preparation. Examples of suitable organic polyisocyanates include the isomers and isomeric mixtures of toluene diisocyanate, 1,5-napthalene-diisocyanate, cumene12,4-diisocyanate, 4-methoxy-1,3-phenylenediisocyanate, 4-chloro-1,3 - phenylene - diisocyanate, 4-bromo-1,3-phenylenediisocyanate, 4-ethoxy-1,3 - phenylenediisocyanate, 2,4' - diisocyanatodiphenylether, 5,6-dimethyl-1,3 - phenylenediisocyanate, 2,4 - dimethyl - 1,3-phenylene-diisocyanate, 4,4' - diisocyanatodiphenylether, benzidinediisocyanate, 4,6 - dimethyl - 1,3 - phenylenediisocyanate, 1,10 - anthracenediisocyanate, 4,4' - diisocyanatodibenzyl, simple or polymeric diphenylmethanediisocyanates such as 3,3-dimethyl - 4,4' - diisocyanatodiphenyl-methane, 2,6 - dimethyl - 4,4 - diisocyanatodiphenyl, 2,4-anthracenediisocyanate, 2,5 - fluorocenediisocyanate, 1,8-naphthalenediisocyanate, 2,6 - diisocyanatobenzfuran and 2,4,6-toluenetriisocyanate. It is to be understood that mixtures of two or more of these polyisocyanates be employed. Aromatic isocyanates are preferred, particularly the toluene diisocyanates.

To this first component can also be added other ingredients such as stabilizers, thickeners, fillers and the like in amounts considered useful by those skilled in the art, e.g., up to 1 part of stabilizer and up to 50 parts of fillers per 100 parts by weight of prepolymer.

The second component is the cross-linking mixture and generally contains a chain-extending and cross-linking compound such as a polyhydroxy compound, urethane catalysts to promote the curing reaction, and optionally, other ingredients such as fillers, antioxidants, stabilizers and thickeners. The polyhydroxy compound is generally employed in amounts well known to those skilled in the art, generally in an amount to give from 0.97 to 1.15 isocyanate group in the prepolymer per hydroxyl group in the polyhydroxy compound.

The urethane catalysts promote the chain extension and cross-linking reaction and include stannous carboxylates such as stannous acetate, stannous octoate, stannous laurate, stannous oleate and the like; dialkyl tin salts of carboxylic acids such as dibutyltin diacetate, dibutyltin dilaurate, dibutyltin maleate, dibutyltin di-2-ethyl-hexoate, dilauryltin diacetate, dioctyltin diacetate and the like. Similarly, there can be used a trialkyltin hydroxide, dialkyltin oxide or dialkytin chloride. Examples of these compounds include trimethyltin hydroxide, tributyltin hydroxide, trioctyltin hydroxide, dibutyltin oxide, dioctyltin oxide, dilauryltin oxide, dibutyltin dichloride, dioctyltin dichloride and the like. As an alternative or in addition to the above tin compounds, various tertiary amines can be used such as triethylamine, benzyldimethyamine, triethylendiamine and tetraamethylbutanediamine. The tin catalysts are generally used in amounts in the range of about 0.01 to 0.5 part by weight per 100 parts of prepolymer. The tertiary amines can be used in amounts in the range of 0.01 to about 5 parts by weight per 100 parts of prepolymer.

A number of special aromatic substituted diamines with decreased isocyanate reactivity are sometimes used to chain extend and to cross-link between the free isocyanate groups of the isocyanate-terminated prepolymer and to cure the compound into a rigid, tough cured adhesive. Examples of arylene diamines useful herein include 4,4'-methylenebis(2-bromoaniline);
4,4'-methylenebis(2-chloroaniline);
4,4'-methylenebis(2-methoxyaniline);
4,4'-methylenebis(2-methylaniline);
4,4'-methylenebis(2-n-butylaniline);
4,4'-methylenebis(2-n-octylaniline);
bis(4-aminophenyl)sulfone;
cumene-2,4-diamine;
4-chloro-1,3-phenylenediamine;

4-bromo-1,3-phenylenediamine;
2,4-dimethyl-1,3-phenylenediamine;
4,6-dimethyl-1,3-phenylenediamine;
9,10-anthracenediamine;
4,4'''-diaminodibenzyl;
2,4-diaminostilbene;
1,4-anthradiamine;
2,5-fluorenediamine;
1,8-naphthalinediamine;
2,6-diaminobenzfuran;
3,3'-diphenyldiamine;
2-methylbenzidine;
2,2'-dimethylbenzidine;
2,2'-dichlorobenzidine;
2,2'dimethoxybenzidine;
2,2',5,5'-tetramethylbenzidine;
2,2'-dichloro-5,5'-diethoxybenzidine;
2,2'-difluorobenzidine;
3,3-'difluorobenzidine;
2,2',6,6'-tetrachlorobenzidine and
2-iodobenzidine.

The separate components are generally blended together in a high shear mixing head and the resultant uniform blend applied directly to the surface to be bonded. The surfaces to be bonded should be clear of foreign matter and grease, and this is generally accomplished by such known techniques as by sand-blasting or by swabbing the surfaces lightly with a rag soaked in some solvent containing, for example, from 5 to 50% by weight of a polymeric isocyanate such as 4,4'-diisocyanatodiphenylmethane.

While the adhesives of this invention are known as "isocyanate-based" adhesives, they may contain other materials that are not involved with the formation of the urethane bond. The strength of the cured polyurethane adhesive is so great as to permit extended dilution with fillers and other low cost materials without sacrificing a significant amount of the strength of the adhesive bond.

This invention consists essentially in the replacement of polyhydroxy compound in a suitable adhesive mix by between about 4 to 30 equivalent percent of the primary amine having the structure $R(NH_2)_n(OH)_m$ wherein each R is an aliphatic essentially hydrocarbon group of no more than about eight carbon atoms and having a valence of $m+n$, $m$ can be 0, 1, 2 or 3 and $n$ can be 2, 3 or 4. The term "aliphatic" is intended to mean that the amine and any hydroxyl groups are attached to aliphatic carbon atoms rather than to aromatic carbon atoms. Consequently, the term "aliphatic" includes both alkylene groups and such groups as the xylylene group. The term "essentially hydrocarbon" is intended to allow for the presence of some extraneous atoms such as secondary and tertiary nitrogen atoms in addition to the carbon atoms which form the compound backbone.

The determination of the amount of the subject primary amine is based solely on the number of primary amine groups in the amine compound. Thus, 4 to 30 equivalent percent of primary amine based on the prepolymer means 0.04 to 0.30 primary amine groups per free isocyanate group in the prepolymer. Any hydroxyl groups present in the primary amine compound are taken into account only in the determination of the total amount of primary amine compound and polyhydroxy compound so that the ratio of free isocyanate groups in the prepolymer to the total primary amine and hydroxyl groups in the combined primary amine compound and polyhydroxy compound is in the range of 0.97 to 1.15.

The defined primary amine is combined with the uncured adhesive prior to applying it to the surfaces to be bonded. The calculation of the required amount of the multi-primary amine to be added or combined with the adhesive is based upon the free isocyanate content of the isocyanate-terminated prepolymer and is clearly within the ambit of one skilled in the chemical art. At levels below about 4 equivalent percent, the increase in reaction rate is insignificant whereas above about 30 equivalent percent the amine impedes handling. The preferred range is about 5 to 15 equivalent percent.

The act of combining the primary amine with the adhesive prior to applying the adhesive to the surface to be bonded can be accomplished by premixing the amine with the cross-linking component of the two component adhesive or by adding the amine dissolved in a suitable diluent directly to the mixing head as a third stream so that it is introduced into the adhesive at the mixing head. For convenience, it has been found desirable to premix the amine with the cross-linking component as this will facilitate later blending with the isocyanate-terminated prepolymer component, will not degrade the storage life or storability of the cross-linking component and will eliminate the need for modification of a standard mixing head.

As between aliphatic or aromatic R groups in the primary amines it has been found that aliphatic R groups produce a significantly faster increase in viscosity of the urethane adhesive than do the aromatic R groups. It is thought that the defined primary amines employed in this invention improve the sag or run-off resistance of the subject adhesives because of the exceedingly high reaction rate of primary amines with respect to isocyanate groups and because of the hydrogen bonding characteristics of the formed urea groups following the reaction.

A wide variety of primary amine compounds, both distilled and crude, are usable herein. Examples of suitable primary amine compounds include diethylenetriamine, ethylenediamine, tetramethylenediamine, pentametylenediamine, hexamethylenediamine, 2,5-diamino-n-hexane, xylylne diamine and 1,3-diaminopropanol-2.

The method of using the adhesive made according to this invention is as follows: A plastic adherend such as a fiber reinforced plastic (FRP) panel or structure is positioned in a clamping frame in preparation for the bonding operation. The bonding surface of the structure is cleaned, for example, with a solution of 10 percent by weight 4,4'-diisocyanatodiphenylmethane in toluene and permitted to air dry. Another adherend such as a plastic or metal panel or structure that is to be bonded to the first adherend is positioned near the first adherend and its bonding surface is also cleaned. Into a mixing head positioned near the bonding operation is introduced the above-described two adhesive components wherein the cross-linking component contains from 4 to 30 equivalent percent of the primary amines exemplified above and these components are intimately blended to produce an uncured adhesive. This uncured adhesive is formed into layers of finite thickness over the bonding surfaces of both adherends and the adherends are subsequently placed in contact and clamped together. Where the surfaces to which the adhesive is applied are on an inclined or overhead plane, the adhesive does not exhibit the sag or run-off prevalent with present commercially available urethane adhesives not containing the defined primary amines employed in this invention. Following a short time in which the urethane adhesive cures, e.g., 15 to 45 minutes at room temperature, the bonded adherends are released from the clamps, and the fully bonded structure is sent along to the next operation.

The following examples further illustrate how to practice this invention and are not intended either singly or in combination to limit the invention, which is properly delineated in the claims. Unless noted otherwise, all quantitative measurements are by weight.

EXAMPLE I

An isocyanate-terminated prepolymer was prepared by reacting 333 parts (0.3 mol) of a polyoxypropylene glycol having an average molecular weight of about 1025 and 266 parts (0.6 mol) of a polyoxypropylene glycol having a molecular weight of about 425 with 435 parts (2.5 mols) of an 80/20 molar ratio mixture of 2,4- and 2,6-isomers of toluene diisocyanate. The resulting isocyanate-terminated prepolymer had a free isocyanate content of 0.0026 gram-mols/gram and a viscosity of 11,000 cps. at 73° F. A cross-linking compound was made from 101 grams of N,N,N′,N′-tetrahydroxyethylenediamine with 50 grams of polyoxypropylenetriol having an average molecular weight of 3000. Eleven (11) grams of the prepared isocyanate-terminated prepolymer were thoroughly mixed with 2 grams of the cross-linking compound, and the mixture was brushed onto the clean vertical surface of a fiber reinforced polyester (FRP) resin panel. It was noted that the adhesive compound ran down the surface and dripped off the lower edge of the test piece at room temperature.

The same experiment was repeated except that 0.05 gram of ethylenediamine, $H_2N-CH_2-CH_2-NH_2$, equal to 5.85 equivalent percent based upon the free NCO content of the prepolymer, was thoroughly mixed with the two grams of cross-linking compound prior to blending the two components. Immediately after mixing the components, the adhesive was applied to the clean vertical surface of another FRP panel. It was noted that the adhesive had enough body to stay on the vertical surface of the FRP panel without running or sagging.

This example clearly shows the beneficial aspects of the invention, i.e., the increase in resistance to sag of the polyurethane-based adhesive by the addition of a minor amount of a diprimary amine of the above-disclosed structural formula. The adhesive strength of the adhesive was not negatively affected by the inclusion of the ethylene diamine.

EXAMPLE II

The second part of Example I was repeated substituting for the 0.05 gram of ethylene diamine various quantities of diprimary amines having the structural formula $$H_2N-R-NH_2$$

wherein R was an aliphatic group. The viscosity increases of the resulting adhesive mixtures as a function of time after application to the FRP surface are listed in the table below:

TABLE

| | Time (min.) | Viscosity (c.p.s.) |
|---|---|---|
| No diprimary amine (control) | 0 | 20,000 |
| | 2 | 22,000 |
| | 3 | 24,000 |
| | 4 | 24,000 |
| | 5 | 25,000 |
| | 6 | 25,000 |
| | 7 | 25,000 |
| 10 equivalent percent ethylenediamine | 0 | 20,000 |
| | 2 | 140,000 |
| | 3 | 150,000 |
| | 4 | 165,000 |
| | 5 | 180,000 |
| | 6 | 220,000 |
| | 7 | 270,000 |
| 20 equivalent percent diethylenetriamine | 0 | 20,000 |
| | 2 | 120,000 |
| | 3 | 140,000 |
| | 4 | 150,000 |
| | 5 | 160,000 |
| | 6 | 165,000 |
| | 7 | 170,000 |

This example shows the significant increase in viscosity of the polyurethane adhesive following addition of various diprimary amines in various quantities. The adhesive strengths of the adhesives containing the primary amines were no less than the adhesive strength of the control.

EXAMPLE III

A prepolymer containing 0.0023 gram-mols of free isocyanate groups per gram was prepared using the materials and method described in Example I. 43.3 grams of this prepolymer were mixed with 9.0 grams of a cross-linking compound consisting of 95 parts of a polyoxypropylenetetrol having an average molecular weight of 400, 6 parts of 1,2-propanediamine and 1 part of stannous octoate. The composition had a pot life of 2 to 3 minutes and exhibited excellent sag resistance. The resulting cured composition had good adhesive properties.

The improved polyurethane-based adhesive of this invention can be used on inclined or vertical surfaces as well as overhead and level surfaces and other areas and can be used with conventional adhesive application equipment and without the need for modification or alteration.

What is claimed is:

1. In a method for preparing a polyurethane-based adhesive system comprising intimately blending an isocyanate-terminated prepolymer, a polyhydroxy compound and a catalyst, the improvement comprising substituting for part of said polyhydroxy compound from about 4 to 30 equivalent percent, based on the free isocyanate content of said isocyanate-terminated prepolymer, of primary amine groups added as a compound having the structure $R(NH_2)_n(OH)_m$ wherein each R is an aliphatic essentially hydrocarbon group of no more than about 8 carbon atoms and having a valence of $m+n$, $m$ ranges from 0 to 3 and $n$ ranges from 2 to 4, the mol ratio of free isocyanate groups in said prepolymer to the total hydroxyl and primary amine groups in said primary amine compound and said polyhydroxy compound being in the range of 0.97:1 to 1.15:1.

2. The method of claim 1 wherein said polyhydroxy compound and said catalyst form a separate component of said adhesive prior to mixing with said isocyanate-terminated prepolymer and said amine is combined with said component prior to combining said component with said isocyanate-terminated prepolymer compound.

3. The method of claim 1 wherein $m$ in said primary amine compound is zero.

4. The method of claim 1 wherein said primary amine compound is employed in an amount to supply from about 5 to 15 equivalent percent primary amine groups based on the free isocyanate content of said isocyanate-terminated prepolymer.

References Cited

UNITED STATES PATENTS 3,644,569   2/1972   Pietsch et al. ___ 260—77.5 A M

DONALD E. CZAJA, Primary Examiner

M. J. WELSH, Assistant Examiner

U.S. C. X.R.

260—75 NH, 77.5 AQ

FO-1050
(5/69)

UNITED STATES PATENT OFFICE
CERTIFICATE OF CORRECTION

Patent No. 3,714,127          Dated January 30, 1973

Inventor(s) Hubert J. Fabris, Edwin M. Maxey, Heinz Uelzmann

It is certified that error appears in the above-identified patent and that said Letters Patent are hereby corrected as shown below:

Column 1, line 7, after the addresses of the inventors, add --assignors to The General Tire & Rubber Company--

Signed and sealed this 13th day of November 1973.

(SEAL)
Attest:

EDWARD M. FLETCHER, JR.
Attesting Officer

RENE D. TEGTMEYER
Acting Commissioner of Patents